(12) United States Patent
Watkins et al.

(10) Patent No.: US 7,124,319 B2
(45) Date of Patent: Oct. 17, 2006

(54) DELAY COMPENSATION FOR SYNCHRONOUS PROCESSING SETS

(75) Inventors: John E. Watkins, Sunnyvale, CA (US); Paul J. Garnett, Camberley (GB); Stephen Rowlinson, Reading (GB)

(73) Assignee: Sun Microsystems, Inc., Santa Clara, CA (US)

( * ) Notice: Subject to any disclaimer, the term of this patent is extended or adjusted under 35 U.S.C. 154(b) by 626 days.

(21) Appl. No.: 10/389,444

(22) Filed: Mar. 14, 2003

(65) Prior Publication Data

US 2003/0182594 A1 Sep. 25, 2003

(30) Foreign Application Priority Data

Mar. 19, 2002 (GB) .................................. 0206451.7

(51) Int. Cl.
*G06F 11/00* (2006.01)
(52) U.S. Cl. ..................... 714/12; 709/248; 370/235; 710/310
(58) Field of Classification Search ............ 714/12, 714/11, 10, 4, 815, 798; 370/235, 234; 709/248, 709/235, 234; 710/306, 310
See application file for complete search history.

(56) References Cited

U.S. PATENT DOCUMENTS

| | | | |
|---|---|---|---|
| 5,276,899 A | 1/1994 | Neches | |
| 5,790,776 A | 8/1998 | Sonnier et al. | |
| 5,794,018 A * | 8/1998 | Vrvilo et al. | 713/400 |
| 5,838,894 A | 11/1998 | Horst | |
| 5,953,742 A | 9/1999 | Williams | |
| 6,151,689 A | 11/2000 | Garcia et al. | |
| 6,167,477 A | 12/2000 | Garnett et al. | |
| 6,173,351 B1 * | 1/2001 | Garnett et al. | 710/309 |
| 6,175,872 B1 * | 1/2001 | Neumann et al. | 709/231 |

(Continued)

FOREIGN PATENT DOCUMENTS

WO     WO93/25965     12/1993

OTHER PUBLICATIONS

Newton, Harry, Newton's Telecom Dictionary, Feb. 2002, CMP Books, 18th Edition, p. 297.*

(Continued)

*Primary Examiner*—Bryce P. Bonzo
*Assistant Examiner*—Marc Duncan
(74) *Attorney, Agent, or Firm*—Meyertons Hood Kivlin Kowert & Goetzel, P.C.; B. Noël Kivlin

(57) ABSTRACT

A fault tolerant computing system is provided comprising two or more processing sets that operate in synchronism with one another. The two processing sets are joined by a bridge, and there is a communications link for each processing set for transmitting data from the processing set to the bridge. Data transmissions are initiated in synchronism with one another from the respective processing sets to the bridge but are then subject to variable delay over the communications link. Accordingly, a buffer is included in the bridge for storing the data transmissions received from the processing sets for long enough to compensate for the variable delay. The data transmissions can then be fed out from the buffer to a comparator that verifies that the data transmissions received from the two or more processing sets properly match each other. Likewise, a buffer is included in each processing set for storing the data transmissions received from the bridge for long enough to compensate for the variable delay. Control logic in each processing set can then apply the data transmissions to the respective processing set at a predetermined time.

42 Claims, 5 Drawing Sheets

U.S. PATENT DOCUMENTS

| | | |
|---|---|---|
| 6,199,171 B1 * | 3/2001 | Bossen et al. .................. 714/2 |
| 6,233,702 B1 | 5/2001 | Horst et al. |
| 6,247,059 B1 * | 6/2001 | Johnson et al. ............. 709/237 |
| 6,247,143 B1 * | 6/2001 | Williams ..................... 714/11 |
| 6,249,756 B1 * | 6/2001 | Bunton et al. ................ 703/25 |
| 6,260,159 B1 | 7/2001 | Garnett et al. |
| 6,289,022 B1 | 9/2001 | Gale et al. |
| 6,496,940 B1 | 12/2002 | Horst et al. |
| 6,622,219 B1 | 9/2003 | Tremblay et al. |
| 6,640,287 B1 | 10/2003 | Gharachorloo et al. |
| 6,704,887 B1 * | 3/2004 | Kwiat et al. .................. 714/10 |
| 6,721,796 B1 * | 4/2004 | Wong ......................... 709/232 |
| 6,782,453 B1 | 8/2004 | Keltcher et al. |
| 6,785,763 B1 | 8/2004 | Garnett et al. |
| 6,785,777 B1 | 8/2004 | Garnett et al. |
| 6,928,583 B1 * | 8/2005 | Griffin et al. ................ 714/11 |
| 6,985,966 B1 * | 1/2006 | Gupta et al. ................ 709/248 |
| 2002/0065986 A1 | 5/2002 | Garnett et al. |
| 2002/0065996 A1 | 5/2002 | Garnett et al. |
| 2002/0066049 A1 | 5/2002 | Garnett et al. |
| 2003/0182492 A1 | 9/2003 | Watkins et al. |

OTHER PUBLICATIONS

The Authoritative Dictionary of IEEE Standards Terms, Dec. 2000, IEEE Press, Seventh Edition, pp. 123-124.*

Combined Search and Examination Report for GB0411173.8, Jul. 21, 2004, 3 pages.

International search report application No. GB0206451.7 mailed Oct. 30, 2003.

International search report application No. GB0206451.7 mailed Nov. 12, 2002.

* cited by examiner

DELAY COMPENSATION FOR SYNCHRONOUS PROCESSING SETS

FIELD OF THE INVENTION

The present invention relates to a fault tolerant computing system suitable for an environment in which data communications are subject to variable delays.

BACKGROUND OF THE INVENTION

In many computer applications, it is very important to be able to provide a high degree of reliability. A known way of achieving this is to use a fault tolerant computer, such as taught in U.S. Pat. No. 6,167,477. The system described in this patent has two (or more) processing sets that are configured to perform identical operations. The processing sets are joined by a bridge (known as a voting bridge), which in turn is linked to a bus. Various input/output devices are then attached to the bus (e.g. disk storage, network communications, etc.). The design philosophy of this fault tolerant system is to try and prevent any error that might occur within one of the processing sets from propagating into the outside world, in other words from the bridge onto the bus and from there to the various external devices.

In order to achieve this, the output from the processing sets is compared at the bridge. Any discrepancy between the outputs from the different processing sets is detected and serves as an indication of potential error.

At this point, the system generally tries to make a determination of which of the processing sets is responsible for the error. In some cases this can be relatively straightforward. For example if one processing set is trying to perform an illegal operation, such as writing to a non-existent address on the bus, or is producing output with a parity error, then it is a reasonable assumption that it is this processing set that is malfunctioning. Also, in systems having more than two processing sets, it is sensible to go with the verdict of the majority of the processing sets. For example, in a system with three processing sets, these can effectively be regarded as voting two-to-one in favour of the correct output (assuming only a single processing set is faulty at a given time).

On the other hand, if the discrepancy simply represents a difference in output data between two processing sets, then it is difficult for the bridge to determine, a priori, which one of the two sets is behaving incorrectly. In this case, the bridge can ask the two processing sets to run various diagnostic tests on themselves, in order to try and pinpoint the source of the error.

Assuming that a determination of the malfunctioning processing set can indeed be successfully made, then the system can continue in operation by using only the processing set(s) that is (are) behaving correctly, with the output from the other processing set being ignored. Of course, if there were originally only two processing sets, then at this point the system is no longer fault tolerant, since there is no comparison of output from different processing sets. Therefore, in some such situations it may be desirable for the fault tolerant system to simply stop operation once a discrepancy is detected, pending suitable maintenance or restorative action. Such a fault tolerant system can still be regarded as robust because it can detect the presence of a defective processing set, and prevent this from having any unwanted external manifestation or consequence. Of course, if the system originally included more than two processing sets, then it can continue in fault tolerant mode even after one of the processing sets has to be discounted as faulty.

It will be appreciated that in a system initially having two processing sets, the particular circumstances of the system will determine whether it is better to react to an error by stopping processing altogether until corrective action is taken, or instead to automatically continue operations on the basis of the one remaining good processing set. For example, if the system is being used for nightly reconciliation of various accounting records, it may be better to defer operations until fault tolerance can be restored. On the other hand, if the system is being used for the real-time control of a distribution network, there may be no option but to continue on the basis of the single processing set.

Note that in some situations it is possible for there to be a discrepancy in the outputs from the processing sets even if they are all still operating correctly. This can arise when the output depends on the particular processing set that produced it, for example because it incorporates the serial number of the CPU chip. However, this problem is rather rare, and in practice can normally be worked around.

A much more significant issue concerns the relative timing of the processing sets. Thus if the processing sets do not stay in proper synchronisation with one another, then their outputs will appear to be different despite the fact that both are operating correctly. In order to address this problem, the fault tolerant system of the above-referenced patent drives all the processing sets with a single clock signal. More particularly, each processing set has its own internal clock, which is regulated by a phase-locked loop (PLL) oscillator. An appropriate control signal is then supplied to the various clocks to ensure that their respective processing sets are properly maintained in lock step with one another. In addition, the bridge has its own clock, and this is similarly kept in synchronisation with the clocks of the processing sets. As a result of this common timing, the bridge should receive the outputs from the processing sets effectively simultaneously, and so can perform a proper comparison of them.

The processing sets are also arranged to have a purely synchronous (lockstep) design, avoiding metastable states. This serves to eliminate differences that might be caused for example by an input signal arriving exactly on a clock boundary, in order to ensure that such a signal is ultimately resolved in the same fashion by each processing set. This avoids different processing sets allocating the input signal to different clock cycles due to (inevitable) physical variations in supposedly identical components of the different processing sets.

One limitation of the above approach is that it requires timing variations on the links from the processing sets to the bridge to be small compared to the clock cycle, in order that fully synchronous lockstep behaviour can be maintained as regards the communications between the bridge and the different processing sets. This is conventionally achieved by placing the processing sets and the bridge together in the same chassis or rack assembly to ensure that the outputs from the processing sets are properly received at the bridge at the same clock value.

However, there may be certain situations in which the outputs from the processing sets arrive at the bridge at significantly different times, in other words where jitter or other timing variations in transmission are not small compared to the clock interval. This can then lead to a loss of synchronisation of the outputs, and consequently the detection of discrepancies by the bridge, even although the processing sets themselves are still functioning correctly.

Typically there are two particular circumstances which can give rise to this problem (these may occur either singly or in combination with one another). The first is the desire for ever-increasing clock speeds to boost processing performance. Thus what might be an acceptably small amount of jitter at a relatively low clock speed may become more troublesome as the system is pushed towards higher clock speeds, even if the physical configuration of the system is otherwise unchanged (for example the devices are all located within the same rack assembly).

A second cause of difficulty is that it may be desirable to locate the bridge in a different chassis from the processing sets. Indeed, in some installations the bridge may be located in a different room, a different building, or even at a different geographical site from the processing sets. Likewise, the processing sets may themselves be geographically separated from one another. Such a distributed architecture allows a much more flexible use of hardware, but it also leads to significantly increased transmission delays on the links between the processing sets and the bridge. Such lengthy connections are also much more susceptible to increased jitter and timing variations.

Consequently, it is no longer possible in such systems to guarantee that the outputs from different processing sets will arrive simultaneously at the bridge. This in turn will prevent the bridge from properly checking that the outputs match one another, and confirming that the processing sets are indeed operating correctly. Therefore, it will be seen that a potential loss of synchronicity can undermine the fault tolerant behaviour of the system.

SUMMARY OF THE INVENTION

In accordance with one embodiment of the invention there is provided a fault tolerant computing system comprising two or more processing sets operating in synchronism with one another, a bridge, and a communications link for each processing set for transmitting data from the processing set to the bridge. The data transmissions are initiated in synchronism with one another from the bridge, but may be subject to delay over the communications links. This delay may be variable from one communication link to another (and may also change with time). The bridge includes a buffer for storing the data transmissions received from the processing sets for long enough to compensate for the variable delay. A comparator is then able to determine whether or not the data transmissions received from the two or more processing sets into the buffer match each other.

The comparator may be part of the bridge, or may be separate from it. Typically there is a bus attached to the comparator. Matched data transmissions are passed from the comparator to a bus interface, and from there to various input/output devices attached to the bus. Note that only matched (and so reliable) data transmissions make it as far as these input/output devices. The system may support a flow control mechanism over the communications links to prevent buffer overflow.

In one embodiment, the buffer comprises a FIFO queue associated with each link to a processing set. The bridge includes control logic for synchronising data within each FIFO queue for output to the comparator, once the variable delays have been compensated for. The data transmissions between the processing sets and the bridge are structured into packets. These packets may include an error correcting code (ECC) which is able to detect and (optionally) to correct erroneous packets. A packet may also contain an identifier to allow corresponding packets from different processing sets to be identified.

In one embodiment, a packet contains a sending time (e.g. a clock or counter value when the packet was transmitted). The packet is then transferred from the buffer to the comparator within a set time period after the sending time specified in the packet. Alternatively, the bridge may determine a receipt time for a packet based on the earliest time it is received from one of the processing sets. The packet can then be transferred from the buffer to the comparator within a set time period after the receipt time. In either approach, an error can be flagged if a given packet has not been received from all the processing sets before expiry of the set time period. Note that the value for the set time period may be contained within a packet, or it may be set independently by the bridge (or elsewhere in the system). The set time period can be updated according to current delays on the communications links.

In one embodiment, once a packet has been received from all the processing sets, all versions of the packet are simultaneously transferred from the buffer to the comparator (providing of course that it has been so received within the above-mentioned set time period). If however there are still some outstanding versions of the packet at the end of this time period, then an error can be flagged. This can be done either explicitly, by noting the absence of some versions of a packet from the buffer, or implicitly, by transferring those versions that have been received to the comparator, and detecting the mismatch when these are compared against null data corresponding to processing sets for which the packet is still outstanding.

In accordance with another embodiment of the invention, there is provided a bridge for use in a fault tolerant computing system comprising two or more processing sets operating in synchronism with one another. The bridge includes at least one communications interface for receiving data transmissions from each of the two or more processing sets. Data transmissions that are initiated in synchronism with one another may be subject to variable delay in transit. In other words, the transit time experienced by one processing set will differ from the transit time experienced by another processing set over their respective links to the bridge, due to inequalities in the properties and/or behaviour of the respective links. Therefore the bridge includes a buffer for storing the data transmissions received from the processing sets for long enough to compensate for the variable delay. The bridge further includes a comparator. Data transmissions received from the two or more processing sets into the buffer are passed to a comparator to verify that they match one another.

The above embodiments have focussed on data transmissions from the processing sets to the bridge. However, in accordance with another embodiment of the invention, there is provided a fault tolerant computing system comprising two or more processing sets operating in synchronism with one another, and a bridge that supports data transmissions in the opposite direction. In particular, a communications link is provided for each processing set to transmit data from the bridge to the respective processing set. The data transmissions are initiated from the bridge in synchronism with one another, but are then subject to delay over the communications links, wherein this delay is liable to vary from one communications link to another (and also potentially with time). A buffer is included in each processing set for storing the data transmissions received from the bridge for long enough to compensate for this variable delay. Control logic is provided in each processing set for applying the data transmissions to the respective processing set at a predetermined time.

In one embodiment, the two or more processing sets and the bridge share a common clock signal, and each data transmission includes a specified time value derived from this signal. The predetermined time occurs a set time period after this specified time value, the set time period typically being defined in the data transmission itself. Note that in one embodiment the set time period can be updated according to current delays on the communications links.

In accordance with another embodiment of the invention, there is provided a processing set for use in a fault tolerant computing system comprising two or more processing sets operating in synchronism with one another and a bridge. The processing set includes a communications interface for receiving data transmissions from the bridge. The data transmissions are initiated from the bridge to the two or more processing sets in synchronism with one another, but may then be subject to a variable delay in transit, according to the particular processing set from which the data transmission is being received (and potentially also according to the time of transmission). The processing set also includes a buffer for storing the data transmissions received from the bridge for long enough to compensate for the variable delay, and control logic for applying the data transmissions at a predetermined time.

It will be appreciated of course that fault tolerant systems in accordance with an embodiment of the invention generally support data transmissions in both directions between the bridge and processing sets (i.e. from the former to the latter and vice versa). Such fault tolerant computing systems typically comprise two or more processing sets operating in synchronism with one another; a bridge; and a communications link for each processing set for transmitting data between the processing set and the bridge. Data transmissions over the communications links in either direction are initiated in synchronism with one another, but may then be subject to a delay which varies according to the particular communications link. A buffer is included in the bridge for storing data transmissions received from the processing sets for long enough to accommodate the variable delay. A comparator can then verify that the data transmissions received from the two or more processing sets into the buffer match each other properly. A buffer is also included in each processing set for storing data transmissions received from the bridge for long enough to compensate for the variable delay. Control logic in each processing set can then apply the received data transmissions to the respective processing set at a predetermined time that is consistent across all processing sets.

In accordance with another aspect of the invention, there is provided a method for operating a fault tolerant computing system comprising two or more processing sets operating in synchronism with one another, a bridge and a communications link connecting each processing set to the bridge. The method comprises the steps of: transmitting data from the processing sets to the bridge, wherein the data transmissions are initiated in synchronism with one another but may then be subject to a delay over the respective communications links, and wherein the delay is variable for different ones of the communications links; buffering the data transmissions received at the bridge from the processing sets for long enough to compensate for the variable delay; and then determining whether or not the data transmissions received from the two or more processing sets match each other.

In accordance with another aspect of the invention, there is provided a method for operating a fault tolerant computing system comprising two or more processing sets operating in synchronism with one another, a bridge and a communications link connecting each processing set to the bridge. The method includes the steps of transmitting data from the bridge to each processing set, wherein the data transmissions are initiated from the bridge in synchronism with one another, but are then subject to delay over the respective communications links, this delay varying from one link to another. The method further includes the steps of buffering the data transmissions received at the processing sets from the bridge for long enough to compensate for the variable delay; and applying the data transmissions to the respective processing set at a predetermined time.

It will be appreciated that such methods can generally utilise the same particular features as described above in relation to the system embodiments.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
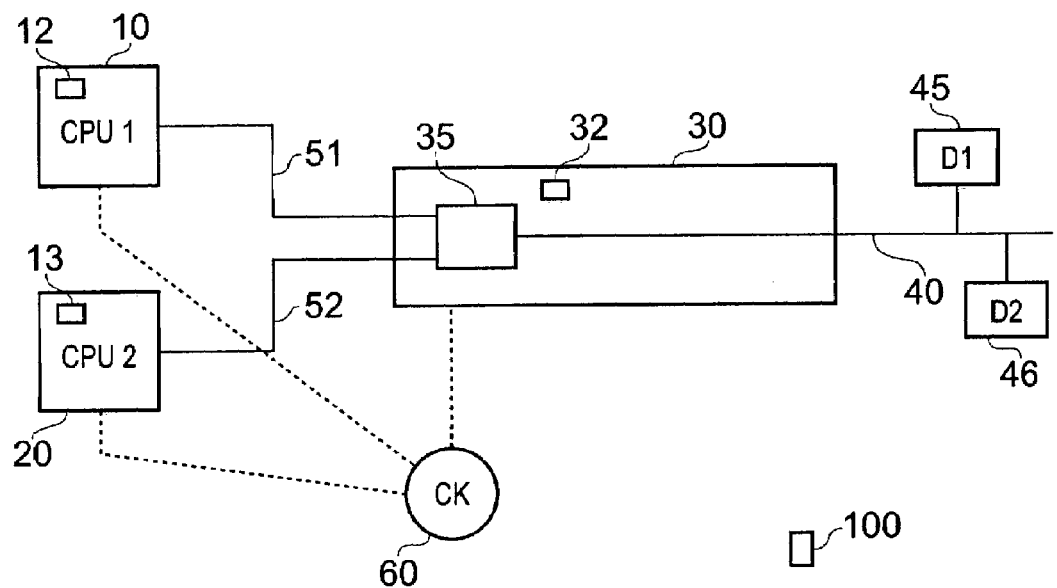
FIG. 1 is a diagram representing an overview of a fault tolerant system in one embodiment of the invention.

FIG. 1 is a diagram providing a schematic depiction of a fault tolerant computer 100 in accordance with one embodiment of the present invention. Fault tolerant computer 100 includes two processing sets, CPU1 10 and CPU2 20, which are both linked to a bridge 30 by links 51 and 52 respectively, although other embodiments may have a different number (N) of processing sets (N>1) (as discussed below in relation to FIG. 7). Output from CPU1 is compared with output from CPU2 by synchronisation unit 35 within bridge 30. The bridge 30 in turn is connected to bus 40, which in one embodiment is a PCI bus. Matched output from CPU1 and CPU2 can be routed to various devices attached to bus 40, such as D1 45 and D2 46. These provide network connections, disk storage, and other appropriate facilities.

Each processing set CPU1 CPU2 contains one or more processors in any suitable configuration, possibly with memory as well. Likewise, bridge 30 is any suitable form of card or other device for combining and outputting data from the processing sets to a bus 40 or other network, and for receiving incoming data from the bus/network, and directing it to each of the processing sets.

It will be appreciated that many other aspects of fault tolerant system 100 are analogous to the above-mentioned U.S. Pat. No. 6,167,477, the teachings of which are hereby incorporated by reference. Accordingly, details of system 100 that are described in this earlier patent will not be repeated herein if they not relevant for an understanding of the present invention.

FIG. 1 further depicts a clock signal 60 which is global, in the sense that it is provided to CPU1, CPU2 and bridge 30. Note that the global clock signal need not be implemented by a single clock. Rather each of the systems may maintain its own clock, and these are then kept in synchronisation with one another (for example by use of a PLL as described above). Reference is also made to U.S. Pat. No. 5,974,103, which discloses a technique that is particularly suitable for providing a synchronised clock signal in the situations where the various components of system 100 are geographically dispersed.

The global clock signal 60 ensures that CPU1 and CPU2 operate in lock step within one another as they perform a matched sequence of operations. Their outputs can then be compared by bridge 30 in order to detect any discrepancy that might indicate the presence of a fault. The clock signal is also used to drive a counter in each of the processing sets, namely counter 12 in CPU 1 and counter 13 in CPU2, as well as a corresponding counter 32 in bridge 30. These counters therefore effectively make a timing signal available to their respective devices. In one embodiment these counters-are implemented as simple 32-bit registers that are incremented at every clock cycle, but various other implementations and bit sizes could be adopted.

Fault tolerant system 100 supports a reset signal (not shown in FIG. 1), which is sent to the two processing sets CPU1 and CPU2, plus bridge 30. The purpose of the reset signal is to start (or restart) fault tolerant processing. Thus CPU1 and CPU2 respond to the reset signal by setting (or resetting) themselves to a predetermined and common state. This includes setting counters 12 and 13 to a known value (assumed for present purposes to be zero). Likewise, bridge 30 sets counter 32 back to zero in response to the reset signal.

Links 51 and 52 are each implemented in one embodiment as serial links. In other words, transmissions from CPU1 to bridge 30 over link 51 (and vice versa) are performed by transmitting a series of individual data bit values. Similarly, communications between CPU2 and bridge 30 are performed by sending a sequence of data bit values over link 52. Assuming that bus 40 is a PCI bus providing 64 bits of transmission at 64 MHz, then serial links 51 and 52 should support a bandwidth of at least 4 Gbits (0.5 Gbytes) per second, in order to be able to utilise bus 40 at its maximum throughput. This allows for a certain amount of overhead over links 51 and 52, which is inevitable when, as will now be described, a packet-based approach is utilised.

Figure 2:
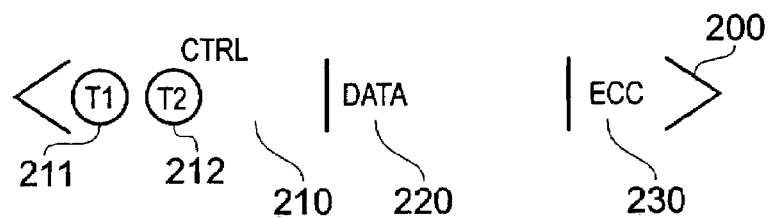
FIG. 2 is a diagram depicting the packet structure used for data communications in one embodiment of the invention.

FIG. 2 illustrates the packet structure used for communications over links 51 and 52. Each packet 200 is divided into three main components: a control portion 210; a data portion 220; and an error correcting code (ECC) portion 230. Of these, the data portion 220 represents output from CPU1 or CPU2 to be sent to device D1 or D2 over bus 40 (or vice versa).

The ECC portion 230 serves to confirm that a data packet has been properly received over link 51 or link 52. Note that portion 230 may detect errors rather than seek to correct them, for example, by using a simple parity bit. Alternatively, more sophisticated approaches, such as a known cyclic redundancy code (CRC), could be used in region 230.

It will also be recognised that ECC region 230 may be omitted altogether if links 51 and 52 are sufficiently reliable that there is only a negligible rate. Of course, even if ECC portion 230 were omitted, any error on the output from one of the CPUs will still be detected when the outputs from the two different CPUs are compared by bridge 30. In this context, the provision of ECC region 230 provides an enhanced safeguard in that it allows the direct detection of an erroneous packet. This in turn can lead to an appropriate error recovery procedure, either by using the inherent properties of the ECC itself (if suitable), or by asking the source CPU to retransmit the packet in question.

Data packet 200 also includes a control region 210. This may incorporate a variety of components, such as an output address for data component 220, the size of packet 200 (if this is not fixed), and some synchronisation pattern to denote the start of packet 200. It will be appreciated that this sort of control data for a packet is well-known in the art and will not be discussed further.

Of particular relevance for present purposes, control region 210 includes two time stamp fields. These are depicted in FIG. 2 as T1 211 and T2 212. The value of T1 represents the clock counter value when the packet was transmitted by CPU1 or CPU2 to the bridge 30 (or vice versa). The value of T2 represents a time allowed for completion, as will be described in more detail below.

(It will be appreciated that in a typical embodiment, T1 comprises a sequence counter value, and T2 comprises a sequence counter increment, where the sequence counter is driven by the clock or some other appropriate mechanism. Thus T1 and T2 may be representative of time values, rather than time values per se).

The control region 210 may also include an identifier to allow corresponding packets from different processing sets to be matched together, although this can be omitted if links 51 and 52 do not suffer from packet loss or reordering. One possibility is for the identifier to comprise a sequence number which is incremented between successive packets. This provides a mechanism to allow the processing sets to detect missing packets in transmissions from the bridge, as discussed further in relation to FIG. 6 below.

Figure 3:
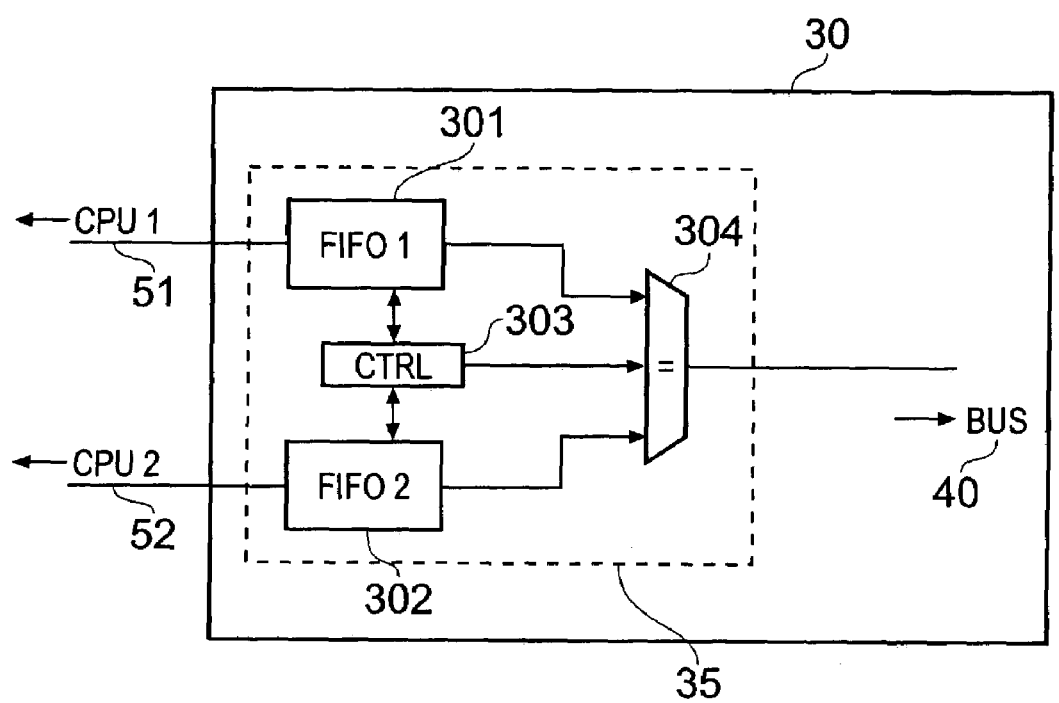
FIG. 3 is a diagram illustrating in more detail the structure of the bridge used in the fault tolerant system of FIG. 1.

FIG. 3 illustrates the structure of bridge 30 in more detail and in particular the major components of synchronisation unit 35. Note that this unit may be implemented for example by an application specific integrated circuit (ASIC), a programmable logic array (PLA), a processor chip, or any other suitable device. As previously discussed, bridge 30 receives a connection from each CPU, namely link 51 from CPU1 and link 52 from CPU2. Input from each of these links is received into a first in, first out (FIFO) queue, in particular FIFO1 301 and FIFO2 302 respectively. The purpose of these two queues is to allow the synchronisation of data arriving at bridge 30 from CPU1 and CPU2.

The operation of FIFO1 and FIFO2 is governed by a control unit 303. A first task of the control unit is to check that any incoming packets have been properly received into FIFO1 and FIFO2. This is accomplished by verifying the ECC portion 230 of the packet (if provided). If an error is detected, the control unit 303 may be able to correct it automatically on the basis of the information in ECC portion 230, or it may request the sending processing set to retransmit the packet. Alternatively, the control unit may simply discard the erroneous packet, in combination with its equivalent from the other processing set.

Assuming now that there are no ECC errors, the next task of the control logic 303 is to synchronise the data in FIFO1 and FIFO2. In other words, the control logic must compensate for any jitter or variation in timing delay across links 51 and 52. The mechanism for performing this synchronisation is discussed in more detail below in relation to FIG. 4.

Finally, once control unit 303 has synchronised the data streams in the two FIFOs, it causes the data to be passed out of the FIFOs into a comparator 304. The purpose of the comparator is to confirm that the two data streams are indeed identical, as would be expected for proper operation of the fault tolerant system 100. Assuming that this is indeed the case, the comparator then produces a single output data stream, which is passed out on to bus 40 for forwarding to the attached devices shown in FIG. 1 above. On the other hand, if the two data streams do not match one another, then control unit 303 or other appropriate logic (not shown) can be invoked to try to resolve these differences using various techniques described above in relation to known devices.

Note that if an error is detected, care must be taken with regard to any packets in bridge 30 waiting to be sent across bus 40. Thus if it can be determined which is the correct version of a packet (for example because the other version is internally inconsistent, or because a majority voting approach is used) then this packet can be transmitted out over bus 40. However, if it is not possible to resolve the discrepancy between the different versions of the packets, then both must be considered as being potentially in error. In this case, both (all) versions of the packet have to be discarded, and accordingly the data contained therein is effectively not output from the fault tolerant system.

Figure 4:
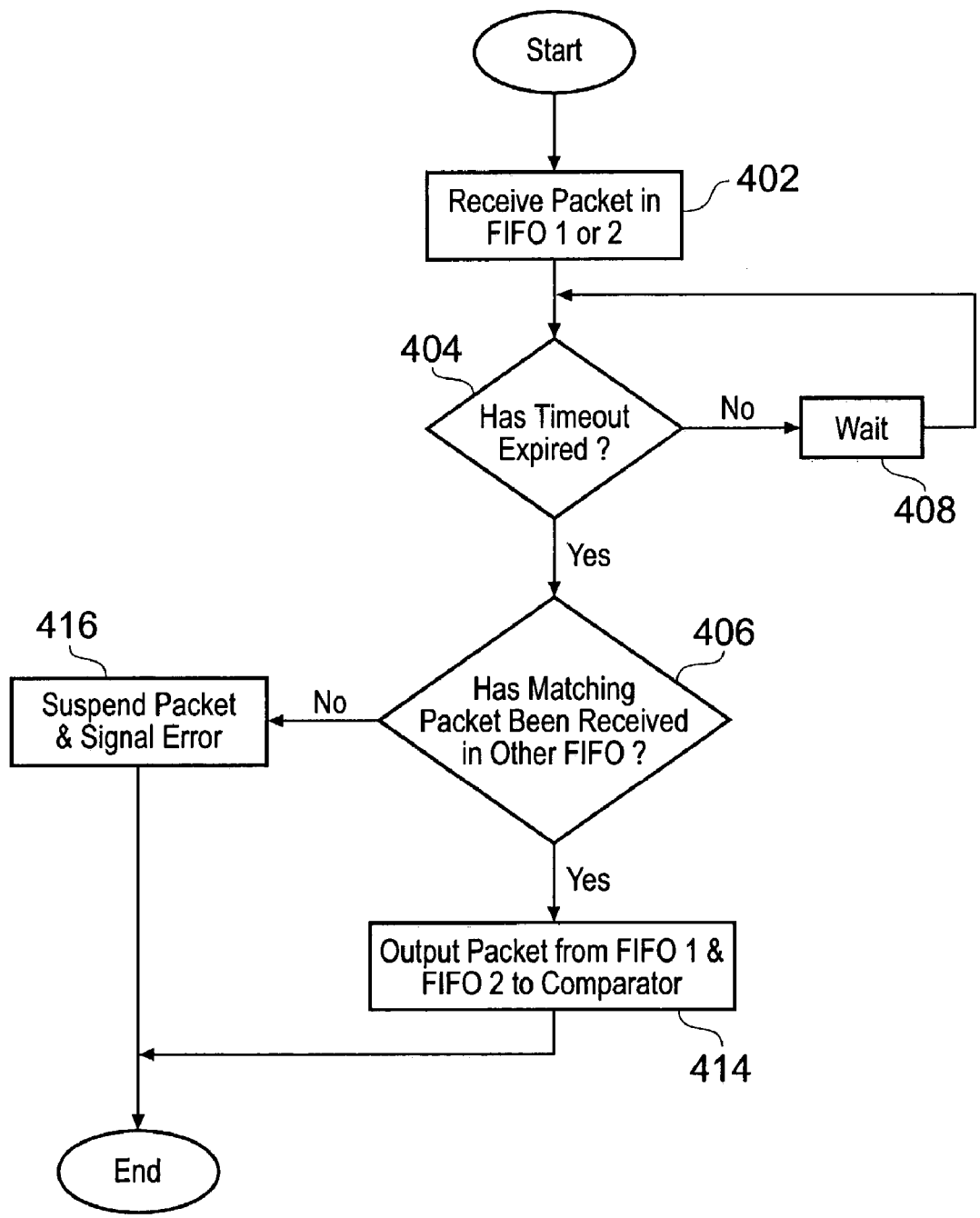
FIG. 4 is a flowchart illustrating processing performed by the bridge of FIG. 3 in order to synchronise incoming packets.

FIG. 4 is a flowchart illustrating the operation of control unit 303 as regards the synchronisation of incoming packets received by bridge 30 from CPU1 and CPU2. Such synchronisation is required because although CPU1 and CPU2 operate under a common clock, and should in theory produce the same output at the same time, the receipt of this output at bridge 30 is subject to jitter or variable delay. Thus when an output is received at bridge 30 from one CPU but not from the other CPU, the control logic 303 must decide whether this is due to a system error, in other words the CPUs are no longer properly operating in step with one another, or whether it is just the result of an unequal propagation delay. In the latter case, the control unit 303 must then re-synchronise the outputs from the two processing sets to allow comparator 304 to generate a single data stream to feed to bus 40.

The processing of FIG. 4 commences with the arrival of an incoming packet from CPU1 into FIFO1 or FIFO2 (step 402). The control logic 303 will now perform ECC checking of the packet, and attempt to correct any detected errors. If such correction is not possible, the control logic 303 may potentially request retransmission of the packet, or signal an error, as discussed below in more detail.

Assuming now that the packet is successfully received, a test is made to see whether a timeout has expired (step 404). In one embodiment this time-out is determined by adding together the values of T2 and T1 as included in the received packet (and as depicted in FIG. 2). Note that this time-out effectively represents the decision point for determining whether or not a packet has been delayed beyond the normal expectation. If so, the system will be regarded as operating erroneously. Otherwise, if the time-out period has not yet expired, then the delay in receiving the corresponding packet from CPU2 into FIFO2 is regarded as still being within normal operating bounds.

Assuming for the moment that the time-out period has not yet expired, the method proceeds to waiting step 408, which in effect forms a wait loop until the time-out does indeed eventually expire. At this point, a determination is made at step 406 as to whether or not a matching packet has been successfully received (i.e. without ECC problems) in the other FIFO (or other FIFOs for an N-way system). One simple way to identify a matching packet is to look at the time at which it was transmitted, in particular, the value of T1. This will be unique to a particular packet (assuming that the clock counter has a sufficient number of bits that it does not recycle within the relevant time period), since only one packet can be transmitted at a time on serial links 51 and 52. Alternatively, some other appropriate form of identifier could be included within each packet, typically within the control portion 210 (see FIG. 2).

If control unit 303 does find a matching packet in the other FIFO that has the same identifier (e.g. value of T1) as the packet received at step 402, the packet is simultaneously output (step 414) by control logic 303 from FIFO1 and from FIFO2 to the comparator 304. Here it is verified that the two output streams do indeed match, before the data is passed onto bus 40, and the method terminates.

Note that the comparison of the two output streams from FIFO1 and FIFO2 is greatly simplified once they have been properly synchronised with one another. Thus if these buffers have an output width of M bits (where M might typically be 64 say), then comparator 304 need only receive and compare M bits at a time from each of FIFO1 and FIFO2 in order to perform the matching operation. In other words, the output of one FIFO can be directly compared against the output of the other FIFO, rather than a set of bits somewhere within the other FIFO.

Returning now to step 406, if the matching version of the packet has not been received in the other FIFO(s), then processing passes instead to step 416. This denotes an error situation. In other words, it is determined that the failure to receive the packet in FIFO 2 is due to a system error rather than a propagation delay across link 52. It will be appreciated that this error may be due to a network problem (causing a lost packet), or to a malfunction that has caused a processing set not to output the packet, or to a malfunction that (mistakenly) caused the original version of packet to be output.

In general, it is not known at this stage which of these possibilities is correct, so that an error situation is flagged. The packet received is then suspended within the bridge, rather than being forwarded onto the output bus, pending appropriate diagnostic behaviour (as discussed above), in order to try and ascertain which of the CPUs is performing correctly. If this can be determined, then output from the faulty processing set can be ignored, and the system continues to forward output from the good processing set to bus 40. Alternatively, the detection of an error may cause operation of system 100 to be suspended.

The skilled person will appreciate that there are many possible variations on the processing of FIG. 4. For example, although steps 404 and 408 are depicted as a loop, this processing may typically be implemented by simply entering a wait state lasting until a time-out signal is received (rather than formally performing steps 404 and 408 repeatedly in succession). In addition, two separate time-outs could be used: a first to determine the maximum delay allowed for a version of a packet before an error is declared (to step 416), and then a second subsequent time-out to determine when the matching received versions of the packets are transferred to the comparator (step 414).

Another possibility is that as soon as the packet is present in both FIFO1 and FIFO2, then it is passed onto the comparator 304. This has the advantage of faster flow through the FIFOs, but does mean that the exact time at which data appears on output bus 40 is no longer under direct system control, but rather will vary according to network propagation delays. This could be accommodated by repeating the test of step 406 within the wait loop of steps 404 and 408; a positive outcome from this test would still lead to step 414 (packet output to the comparator), while following a negative outcome to the test processing would remain in the wait loop.

Another possibility is that steps 406 and 416 could simply be omitted altogether from the processing of FIG. 4. In other words, after the time-out of step 404, the control logic automatically at step 414 transfers a packet out of the FIFOs to the comparator. It then becomes the responsibility of the comparator to detect any mismatch as per its normal operation. One drawback of this approach is that it may lose some information about the origin of the error (whether it is due to failure to receive a packet, and if so, from which processing set).

One implication of using FIFOs 301 and 302 to buffer data received from CPU1 and CPU2 is that care must be taken to ensure that they do not overflow, otherwise data could be lost. Therefore in one embodiment, control unit 303 implements a flow control mechanism.

Figure 5:
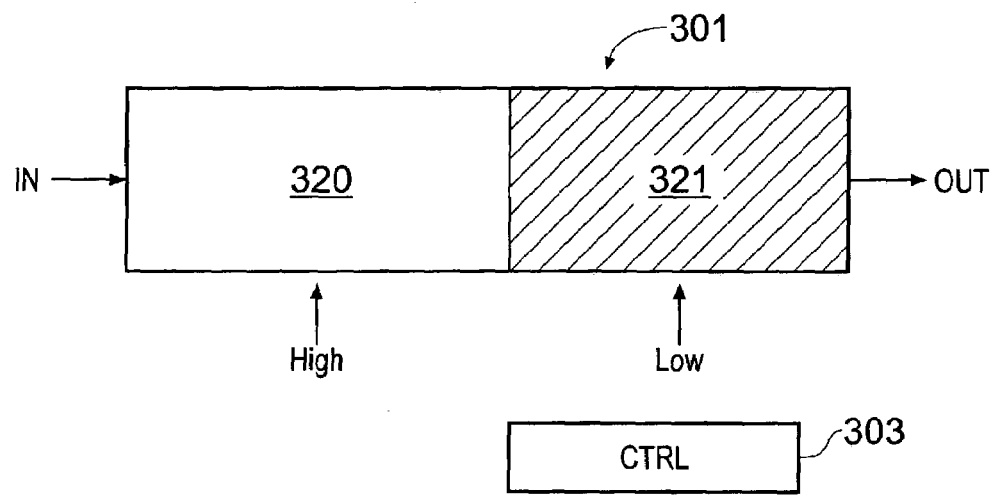
FIG. 5 is a schematic representation of a flow control mechanism applied by the bridge of FIG. 3.

This is illustrated in FIG. 5, which depicts FIFO1 301, although it will be appreciated that a corresponding facility is also provided for FIFO2 302. The shaded region of FIFO1 indicated by reference numeral 321 is that portion which is currently occupied by data, while reference numeral 320 indicates the portion of the queue which is currently unoccupied. Note that in this embodiment, data in a FIFO is always maintained as close to the output as possible.

For each FIFO, a low-water mark and a high-water mark are defined, as illustrated in FIG. 5. The low-water mark is nearer to the output (and further from the input) than the high-water mark. If the occupancy of a FIFO exceeds the high-water mark, then the control unit 303 sends a message to the relevant processing set preventing it from transmitting any more data over the serial link to the bridge. This suspension remains in effect until the control logic 303 detects that the occupancy of the FIFO (i.e. shaded region 321) has fallen back below the low water mark. At this point, control unit 303 sends another message to the relevant processing set to indicate that data transmission can be resumed, since there is now space in the FIFO to accept further transmissions.

It will be appreciated that flow control mechanisms per se are well known in the art. Consequently the skilled person will be aware of many additional details in connection with the mechanism of FIG. 5, as well as various alternative strategies that could also be used for flow control.

For example, link 51 and 52 could support the transmission of the flow control signals from bridge 30 back to the two processing sets CPU1 and CPU2 by incorporating a dedicated line for this purpose. This line would be set high to indicate that data transmissions are to be suspended (i.e. the high water mark has been exceeded), and then low to indicate that transmissions can now be resumed (i.e. the low water marked has been passed). Of course, the opposite polarity could also be adopted on the line (low for suspension, high for continuation or resumption).

An alternative approach would be for the flow control signals to share link 51 and 52 with general data transmissions. In one embodiment, the control unit 303 cannot interrupt an incoming packet from a processing set to send a flow control message back to the processing set. However, it is assumed that there is always the opportunity to transmit such a message between successive packets (for example, the link interface always provides a timeslot for such flow control messages inbetween one packet and the next). In this case, it is generally desirable to define a maximum or fixed packet size for transmission from a processing set to the bridge. This then allows the high water mark to be set as equal to the FIFO capacity minus the maximum packet size. Such an arrangement guarantees that the control unit 303 will always have the opportunity to send a flow control signal prior to a FIFO overflowing.

Note that the flow control mechanism of this embodiment therefore operates in terms of discreet packets. In other words, transmissions from a processing set to the bridge are not suspended mid-way through a packet. This arrangement is convenient since the operations of bridge 30 (such as described above in relation to FIG. 4) are conducted in terms of whole packets, even more so if the packet structure includes an ECC portion. Nevertheless, in some situations it may be appropriate to adopt a flow control mechanism that can suspend transmission in the middle of a packet. Flow control can also be utilised even if the data communications between a processing set and the bridge are not packet-based (for example, they are implemented using streaming or some other mechanism).

It will be noted that the flow control signals for FIFO1 and FIFO2 are generally independent of one another. In other words, if FIFO1 passes its high water mark and is subject to flow control, then CPU2 is still allowed to transmit into FIFO2. This is important to ensure that the data in FIFO2 has the opportunity to catch up with the data in FIFO1. If this were not the case, a deadlock situation could arise, in which FIFO1 becomes too full to receive further data, but no data is being passed out of FIFO1 (to make room for further data to be received), because the corresponding data from CPU2 has not yet arrived into FIFO2. Of course, this corresponding data never will arrive if FIFO2 is also subject to flow control at the same time as FIFO1, irrespective of the current actual occupancy of FIFO2.

In general, the provision of flow control allows smaller FIFOs to be used. Indeed, for a system that has a maximum packet size for transmissions from the processing sets to the bridge 30, the FIFOs could be implemented with a capacity as low as this maximum packet size. In this case flow would have to be suspended after receipt of each packet until the packet had arrived in both queues and had been passed out to comparator 304. More conveniently, the FIFOs should be able to accommodate at least two or three packets, optionally more, in order to reduce or avoid the need for flow control and to enhance throughput.

In fact, it is possible to determine a maximum necessary size for the FIFOs based on the time-out periods of FIG. 4 and the data rate over links from the processing sets to the bridge. Thus the two time-outs of FIG. 4 determine the longest possible stay of data in a FIFO (based on steps 404 and 410), and this can be multiplied by the data rate to obtain the maximum amount of data that would need to be stored in a FIFO at any given time. If the FIFOs are indeed implemented with this capacity, then strictly speaking there is no need to provide a flow control mechanism. Note however that one or both of these time-outs may be configurable, as described in more detail below, and this needs to be taken into account in relation to FIFO size.

Of course if one of the processing sets is subject to error then this can lead to overflow of the associated FIFO, for example because an unduly large packet has been produced by the processing set, or because it has ignored a flow control command from the bridge 30. Thus control unit 303 monitors the two FIFOs in order to detect any such overflow. If this does indeed occur, then it is regarded as indicative of erroneous behaviour by the associated processing set, and is handled in the same manner as for any other processing error (as described above).

Depending on the particular installation, and more especially the types of connection used for link 51 and link 52, fault tolerance system 100 may be more or less vulnerable to delayed, corrupted, or completely lost packets. This degree of susceptibility will in turn determine the most suitable strategy for handling such errors. For example, if links 51 and 52 are highly reliable, then it may be appropriate to attribute any error in a packet that cannot be properly resolved by the ECC to a probable malfunction of the source CPU. Consequently, such an error is immediately regarded as indicative of a discrepancy between the processing sets, and is treated accordingly. Such a strategy is generally the most appropriate and conservative approach for a fault tolerant system. (It will be appreciated that fault tolerant systems are relatively expensive, for example because of their redundant hardware, and so it is normally sensible to ensure that the different components are connected together by a reliable network).

Nevertheless, if there is an embodiment where link 51 and/or link 52 happens to be unreliable, then it may be inefficient to attribute every error in a received packet (or complete loss of a packet) to a malfunction of the source processing set. Thus rather than regarding this as an overall system error as per step 416 in FIG. 4, the system may, at least in the first instance, try to request a retransmission of the incorrect or missing packet from the relevant processing set. Only if this request for retransmission is unsuccessful will the error situation of step 416 be attained.

Note that in order to maintain synchronisation between the processing sets, it is most straightforward if a request for packet retransmission for any corrupted or missing packet is directed to both (all) processing sets. This means that any good version of this packet received from the other processing set(s) will have to be discarded from the associated FIFO. (It will be appreciated that in the case of a corrupted packet, the good version may arrive after the corrupted version). As a result, both (all) processing sets will retransmit the relevant packet, thereby allowing them to remain in step with one another.

Returning now to FIG. 2, the value of the first time stamp (T1) is used in effect to define the start time of the time-out period of step 404 (in FIG. 4), while the value of the second time stamp (T2) is used to define the duration of this time-out period. In other words, T1+T2 is the latest time at which receipt of packets from different processing sets can be accepted without regarding the system, or at least the transmission links, as being in error.

There are various mechanisms for determining an appropriate value of T2, and the most suitable method will depend on the specifics of the particular connection used for links 51 and 52 (which of course need not be identical). One approach is to derive a value for T2 based on a theoretical calculation of the properties of the two links. Alternatively, a value for T2 could be derived experimentally, by sending a series of packets from the processing sets to the bridge, and then measuring the spread of network delays (utilising the global clock signal 60) on a statistical basis. It will be appreciated that this testing could be performed in an ongoing manner, thereby allowing the time-out period to be suitably adapted to varying network or link conditions.

Note that in some embodiments, packets from the processing sets to the bridge may omit a value for T1 and/or T2. Thus considering T2 first, the bridge itself can maintain a suitable time-out value to be used instead of T2. (An appropriate setting for this can be determined by the same range of methods described above for setting T2). Instead (or in addition to) omitting T2, T1 may likewise be omitted from packets. In this case the time-out period of step 404 is initiated from first receipt of a given packet at the bridge from one processing set, rather than at T1.

It will be appreciated that if T1 is not included in the data packets, then there is no particular need in this regard for the bridge 30 to share a common clock signal with the two processing sets. This is because there is no absolute time value being sent from the processing sets to the bridge. Of course, the bridge must still be able to recognise the value for T2 (if any) included in the packets, in order to define a timeout period initiated by packet reception, but this does not require global synchronisation (in terms of phase at least) between the bridge and the processing sets. However, in most implementations synchronisation will still generally be required in order to support data transmissions from the bridge back to the processing sets (as discussed in more detail below).

One advantage of including T1 in each packet is that it provides a straightforward mechanism for control unit 303 to monitor network transmission delays. It can do this by comparing the value of T1 in a packet, which represents when it was sent by a processing set, with the value of the clock signal at the bridge when the packet is received. This information can then be used if desired for updating the timeout period of step 404. Including a value of T1 and T2 in a packet also allows the processing sets to determine the time at which a particular packet will be output to comparator 304 (and hence passed onto bus 40, assuming this is deterministic).

A further benefit of including T1 in each packet is that it is found in practice that loss of clock synchronisation between different processing units is a relatively common failure mode of the fault tolerant system 100. Such loss of synchronisation can then be efficiently detected at bridge 30 based on differences in the values for T1 between otherwise matching packets.

The discussion so far has focussed on the transmission of data from the processing sets to the bridge 30, but fault tolerant system 100 will also of course normally be transmitting data in the reverse direction as well, namely from bridge 30 back to the processing sets. In particular outputs from the bridge are placed simultaneously onto link 51 and link 52 for transmission to the respective processing sets without having to go through the FIFOs (the skilled person will be aware of a suitable mechanism for this). These packet transmissions in the reverse direction are also subject to variable network delays, and the system is designed to accommodate this.

Figure 6:
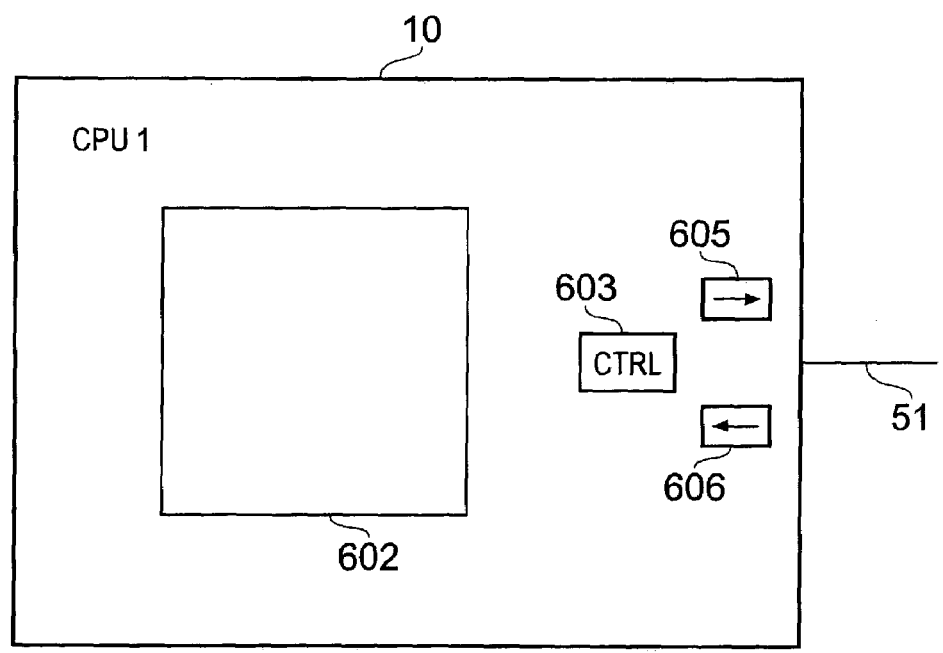
FIG. 6 is a diagram illustrating in more detail the structure of a processing set used in the fault tolerant system of FIG. 1.

FIG. 6 illustrates a processing set CPU1 in more detail. CPU2 will have an analogous configuration (likewise any additional processing sets, although for the moment it will be assumed that there are only two processing sets). Block 602 represents the core processing unit of CPU1, which is maintained in synchronisation with a corresponding block in CPU2. Block 602 may represent a wide variety of structures, from a single processor chip plus memory, through a multiprocessor set with associated memory configuration, up to a whole computing machine or potentially cluster of machines. It will be appreciated that the precise contents of block 602 are not important for present purposes, other than that it generates output for and receives output from bus 40.

The transmissions to and from bridge 30 over link 51 are managed at the CPU1 end by control logic 603. Outgoing transmissions from processing block 602 are placed into buffer 605 for onward transmission over link 51. Note that buffer 605 may not be required, for example if link 51 is dedicated to these transmissions (and so permanently available), and flow control is not implemented. Control logic 603 is responsible for formatting these outgoing transmissions into packets, generating the appropriate ECC fields, etc. It is also responsible for handling any flow control signals back from bridge 30.

CPU1 also includes a second buffer 606, which is used to store incoming packets from bridge 30. In one embodiment, these again have the structure depicted in FIG. 2. Therefore, the control logic 603 firstly checks the ECC to confirm that the packet has been correctly received. Assuming for the moment that there is no error in the ECC (the situation where this is not the case is discussed in more detail below), the packet must now be passed onto processing block 602. However, in order to maintain synchronised processing between CPU1 and CPU2, the packet must be applied at the same time in both machines.

In order to accomplish this, each outgoing packet from bridge 30 to the processing sets includes a value of T1 and T2. As previously described, T1 represents the transmission time of the packet, in this case when it was sent from the bridge 30 to the two processing sets, while T2 represents a time-out for maximum delay. The control logic 603 reads the values of T1 and T2 from each incoming packet, and then transfers the packet from buffer 606 into the processing block 602 at a time equal to T1+T2 (i.e. a period T2 after the packet was sent from the bridge). Since the two processing sets (and bridge 30) all share the same global clock signal, this will result in the packet being applied to simultaneously to the processing block 602 in each processing set, thereby ensuring that synchronisation is maintained. Thus this approach effectively overcomes any variation in packet arrival times at the two processing sets by a introducing a compensating delay in buffer 606.

The inclusion of a value for T2 in each packet provides a straightforward mechanism to allow for changing network conditions. Thus bridge 30 can modify the value of T2 that it uses according to whether the links 51 and 52 are currently subject to relatively long or relatively short delays. However, in an alternative embodiment, the packets sent from the bridge 30 to the processing sets do not include a value for T2. Instead, control logic applies an incoming packet to processing block 602 at a set interval after T1. Naturally each processing set must have the same defined interval. Typically therefore this interval is specified as part of the initial configuration. Optionally there may also be a facility to subsequently update the interval (for example, by command from the bridge 30), dependent on network conditions.

Note that in the above procedures, control logic 603 will not generally be synchronised across the different processing sets, providing that proper synchronisation is maintained at the interface into processing block 602. Thus control logic 606 may react (asynchronously) to the arrival of a packet into buffer 606 to check the ECC, and then schedule transfer of the packet out into processing block 602 at the requisite time (T1+T2).

It will be appreciated that there are certain error situations that may occur in the above processing. Considering first the possibility of overflow in buffer 606, it is rather difficult to implement flow control for packets travelling in this direction because in general bridge 30 performs simultaneous transmissions across both link 51 and link 52. However, since the longest that any packet has to remain in buffer 606 is equal to time T2, and since the bandwidth of link 51 (and link 52) is known, these two quantities can be multiplied together to derive the maximum possible capacity that would be needed for buffer 606.

Furthermore, communications over links 51 and 52 from the bridge 30 to the processing sets can be subject to three different forms of problem: (a) packet loss, (b) packet delay, and (c) packet corruption. Assuming for the moment that the control logic 603 is not able to detect a lost packet, and that the lost packet is received properly at the other processing set, it will be applied to only one of the processing sets. This may cause the machines to lose synchronisation with one another, in the sense that their processing may subsequently diverge as a result of the received/not received packet. This can be detected in due course as a discrepancy in the outputs that the processing sets are sending back to bridge 30. Note again that the fault tolerant system is based on the philosophy that it is only such divergent outputs that are significant—loss of synchronisation itself is not regarded as an error until (and unless) it is manifested to the external world (i.e. outside the processing sets themselves).

If packet loss is a particular problem over the links 51 and 52, then sequence numbers can be included within packets to allow control logic 603 to detect a dropped packet on the basis of a missing sequence number. Although this does not generally allow synchronisation to be maintained, it does help to permit a quick and reliable diagnosis of the problem. It is also possible to try to overcome the problems of packet loss based on more sophisticated strategies utilising packet acknowledgements and retransmissions, although depending on the original source of the data, such an acknowledgement or retransmission protocol may not always be feasible. (As previously mentioned, it is expected that the majority of fault tolerant systems will in fact be implemented with reliable networks between the bridge and the processing sets).

The problem of excess packet delay occurs if a packet arrives after the timeout period has already expired (in other words after T1+T2). This is similar to packet loss, in that the system is now exposed to an error, since the packet is likely to have already been applied at the other processing set. The potential existence of this error is of course immediately clear to the processing set that receives the late packet, and it can therefore take appropriate action (for example, alerting a user or system manager).

Finally, the impact of a corrupted packet will depend upon how it is applied to a processing set. If the correct value of the packet can be restored by the control logic 603 using the ECC then processing will continue normally. On the other hand, if the error is not detected (either because there is no ECC, or because the error has a particularly unfortunate form), then the corrupted packet will be applied to the processing set. In due course, this is likely to lead to divergent processing, and an output discrepancy detected by bridge 30, in the same way as described above for a lost packet. Lastly, the situation may arise where the ECC detects an error, but cannot correct it (this may occur for example if a simple parity bit were used for the ECC). In this case control logic 603 can be configured to flag an immediate error. Alternatively, it could possibly ask for retransmission of the packet from bridge 30 (if available), in the hope that this would arrive before the timeout period for applying the packet expires.

Figure 7:
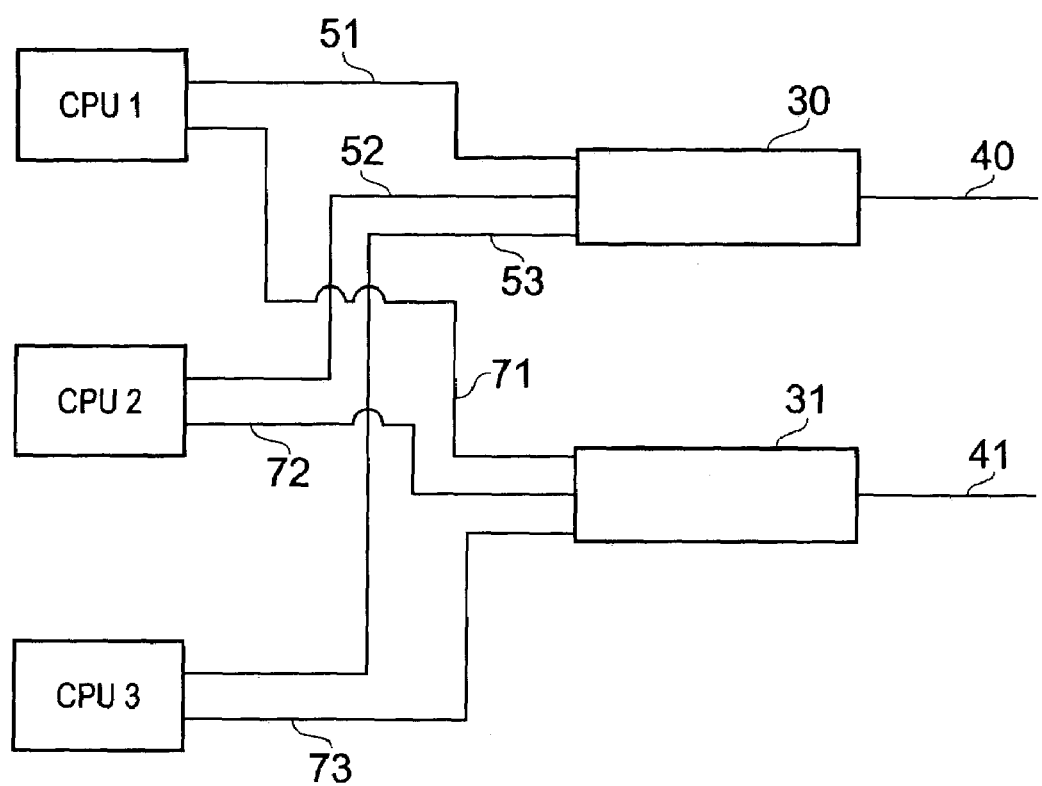
FIG. 7 is a diagram representing an alternative embodiment for a fault tolerant system.

FIG. 7 depicts an alternative embodiment of the invention, this time with three processing sets, CPU1, CPU2, and CPU3 (this is termed a "3-way" system). These processing sets are connected by links 51, 52 and 53 respectively to bridge 30, and thence to bus 40, and by links 71, 72, and 73 respectively to bridge 31, and thence to bus 41. It will be appreciated that, for the sake of clarity, the internal components of these devices are omitted from FIG. 7; however, they will typically correspond to those described above, for example in relation to FIGS. 3 and 6. Note also that the configuration shown in FIG. 7 of three processing sets and two bridges is for the purposes of illustration only, and in other embodiments there may be additional CPUs (an "N-way" system) and/or bridges. In other words, it is generally the case that the techniques described above in relation to the fault tolerant system of FIGS. 1–6 can be scaled to systems having any number (N>1) of processing sets.

The architecture of FIG. 7 permits "majority voting", in that if one CPU fails, then the two good CPUs should still agree. This allows bridge 30 and 31 to continue operating in a fault tolerant mode as described above in relation to FIG. 1. The two bridges 30 and 31 may operate effectively independently of one another (the reason for multiple bridges perhaps then being simply to allow access to a wider range of input/output devices). In this case, the compensation for transmission delays is effectively as described above. Thus each bridge typically receives data from the three processing sets into FIFOs, one per processing set, and the control logic then feeds data from the three FIFOs into a comparator in proper synchronisation. On the other hand, for data transmissions in the reverse direction, the bridge sends data simultaneously to all three processing sets, and then each of these applies the data to its processing block at the correct time, again as described above.

Of course, bridge 30 and bridge 31 do not necessarily have to have the same structure. Thus each bridge could be implemented effectively as a single processor, a card (or combination of cards), or as a computer system in its own right. In the latter case, for example, the buffering of the incoming data could be performed in RAM or other suitable memory instead of individual FIFOs, and the control logic implemented by the processor chip (the skilled person will be aware of a wide range of possible structures). Note that a relatively low-level implementation, such as illustrated in FIG. 3, may be somewhat more reliable.

In an alternative configuration, bridge 30 and bridge 31 could be operated as a sort of mirror pair to provide redundancy or fault tolerance for input/output, as well as at the processing system level. In this case each CPU would receive corresponding data from both bridge 30 and 31, and would then have to perform the sort of reconciliation described in relation to FIG. 4 before the data could be applied to the relevant processing block.

Note that links 51, 52 and 53 and 71, 72, 73 in FIG. 7 do not necessarily have to all be serial links. For example, they could be parallel links (although many parallel links are clocked, and so not vulnerable to variable delays). In addition, they could also be network links, for example over a local area network (LAN), such as Ethernet, or instead over a wide area network, such as the Internet. Furthermore, not all the links need necessarily be of the same form, although it is more convenient if this is indeed the case for matching links (e.g. 51, 52 and 53, or 71, 72, 73), since this will tend to reduce the variation in network delays to/from the different processing sets.

If the links do involve LANs or WANs, then the control logic for receiving and transmitting data in the processing sets and the bridges will have to be more complex in order to support the relevant protocols. Moreover, for some forms of network connection, it is possible that packets may potentially arrive out of order. In this case, the control logic must have the ability to properly resequence the packets to ensure correct matching at the bridge and uniformity at the various processing sets, as appropriate.

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. A fault tolerant computing system comprising:
   two or more processing sets configured to operate in synchronism with one another;
   a bridge coupled to the two or more processing sets via a plurality of communication links;
   wherein the two or more processing sets are configured to initiate data transmissions to the bridge in synchronism with one another, wherein the data transmissions are subject to variable delays between different ones of said communication links;
   a buffer included in said bridge configured to store the data transmissions received from the processing sets for specific time periods to compensate for said variable delays; and
   a comparator configured to determine whether the data transmissions received from the two or more processing sets into said buffer match each other;
   wherein the data transmissions between the processing sets and the bridge are structured into packets, wherein at least one of the packets includes a sending time;
   wherein the buffer is configured to transfer the packet to the comparator within a set time period after said sending time.

2. The fault tolerant computing system of claim 1, wherein said buffer comprises a FIFO queue associated with each link to a processing set.

3. The fault tolerant computing system of claim 2, further comprising control logic configured to synchronize data within each FIFO queue for output to said comparator.

4. The fault tolerant computing system of claim 1, wherein said packets include an error correcting code (ECC).

5. The fault tolerant computing system of claim 1, wherein the bridge and the processing sets share a global clock signal.

6. The fault tolerant computing system of claim 1, wherein said bridge is configured to determine a receipt time for a packet based on the earliest time it is received from one of said processing sets.

7. The fault tolerant computing system of claim 1, further comprising an error detector for flagging if a given packet has not been received from all the processing sets before expiry of said set time period.

8. The fault tolerant computing system of claim 1, wherein a packet contains a value for said set time period.

9. The fault tolerant computing system of claim 1, wherein said set time period is updated according to current delays on the communication links.

10. The fault tolerant computing system of claim 9, further comprising a monitor for assessing current delays on the communications links.

11. The fault tolerant computing system of claim 1, wherein a packet is transferred from said buffer to the comparator as soon as it has been received from all the processing sets, providing this is within said set time period.

12. The fault tolerant computing system of claim 1, wherein a packet contains an identifier to allow corresponding packets from different processing sets to be determined.

13. The fault tolerant computing system of claim 12, wherein a packet contains a sequence number to allow lost packets to be detected.

14. The fault tolerant computing system of claim 1, further comprising a flow control mechanism to prevent overflow of said buffer.

15. The fault tolerant computing system of claim 1, further comprising a bus attached to the comparator, wherein matched data transmissions are passed from the comparator to the bus.

16. The fault tolerant computing system of claim 1, wherein the bridge is configured to initiate data transmissions to each of the processing sets in synchronism with one another, wherein the data transmissions are subject to variable delays between different ones of said communication links, and said fault tolerant computing system further comprises:
 a buffer included in each processing set configured to store the data transmissions received from the bridge for specific time periods to compensate for the variable delays; and
 control logic included in each processing set configured to apply the data transmissions to the respective processing set at a predetermined time.

17. The fault tolerant computing system of claim 16, wherein each data transmission from the bridge to the processing sets includes a specified time value, and said predetermined time occurs a set time period after said specified time value.

18. A fault tolerant computing system comprising:
 two or more processing means configured to operate in synchronism with one another;
 means for bridging the two or more processing means;
 means for linking each of said two or more processing means with the bridging means;
 wherein the processing means are configured to initiate data transmissions to the bridging means in synchronism with one another, wherein the data transmissions are subject to variable delays between different ones of said linking means;
 means for buffering the data transmissions received from the two or more processing means for specific time periods to compensate for said variable delays; and
 means for determining whether the data transmissions received from the two or more processing means match one another;
 wherein the data transmissions between the processing means and the bridging means are structured into packets, wherein at least one of the packets includes a sending time;
 wherein the buffering means is configured to transfer the packet to the comparator within a set time period after said sending time.

19. A bridge for use in a fault tolerant computing system comprising two or more processing sets configured to operate in synchronism with one another, said bridge including:
 at least one communications interface configured to receive data transmissions from each of the two or more processing sets, wherein the data transmissions from the processing sets to the bridge are initiated in synchronism with one another, wherein the data transmissions are subject to variable delays according to the particular processing set from which the data transmission is received;
 a buffer configured to store the data transmissions received from the processing sets for specific time periods to compensate for said variable delays; and
 a comparator configured to determine whether the data transmissions received from the two or more processing sets into said buffer match each other;
 wherein the data transmissions between the processing sets and the bridge are structured into packets, wherein at least one of the packets includes a sending time;
 wherein the buffer is configured to transfer the packet to the comparator within a set time period after said sending time.

20. The bridge of claim 19, further comprising a bus interface, whereby matched data transmissions are passed from the comparator to the bus interface.

21. The bridge of claim 19, wherein the buffer comprises a FIFO queue for each processing set.

22. The bridge of claim 21, further including control logic for synchronising data within each FIFO queue for output to the comparator.

23. A fault tolerant computing system comprising:
 two or more processing sets configured to operate in synchronism with one another;
 a bridge;
 communication links for each processing set configured to transmit data between the processing sets and the bridge, wherein the data transmissions over the respective communication links are initiated in synchronism with one another, wherein the data transmissions are subject to variable delays between different ones of said communication links;
 a buffer included in said bridge configured to store the data transmissions received from the processing sets for specific time periods to compensate for said variable delays;
 a comparator configured to determine whether the data transmissions received from the two or more processing sets into said buffer match each other;
 a buffer included in each processing set configured to store the data transmissions received from the bridge for specific time periods to compensate for said variable delays; and
 control logic included in each processing set configured to apply the received data transmissions to the respective processing set at a predetermined time.

24. A method for operating a fault tolerant computing system comprising two or more processing sets configured to operate in synchronism with one another, a bridge and a plurality of communication links connecting each processing set to the bridge, said method comprising:
 transmitting data from the processing sets to the bridge, wherein the data transmissions are initiated in synchronism with one another, wherein the data transmissions are variable delays between different ones of said communication links;
 buffering the data transmissions received at the bridge from the processing sets for specific time periods to compensate for said variable delays; and
 determining whether the data transmissions received from the two or more processing sets match one another;
 wherein the data transmissions between the processing sets and the bridge are structured into packets, wherein at least one of the packets includes a sending time;
 wherein said buffering the data transmissions includes transferring the packet for verification within a set time period after the sending time.

25. The method of claim 24, wherein said bridge comprises a FIFO queue associated with each link to a processing set for performing said buffering.

26. The method of claim 25, wherein said buffering includes synchronising data within each FIFO queue.

27. The method of claim 24, wherein said packets include an error correcting code (ECC).

28. The method of claim 24, wherein the bridge and the processing sets share a global clock signal.

29. The method of claim 24, wherein said buffering includes determining a receipt time for a packet based on the earliest time it is received at the bridge from one of said processing sets.

30. The method of claim 24, further comprising flagging if a given packet has not been received from all the processing sets before expiry of said set time period.

31. The method of claim 24, wherein a packet contains a value for said set time period.

32. The method of claim 24, further comprising updating said set time period according to current delays on the communication links.

33. The method of claim 32, further comprising monitoring current delays on the communications links.

34. The method of claim 24, wherein a packet is transferred for verification as soon as it has been received from all the processing sets, providing this is within said set time period.

35. The method of claim 24, wherein a packet contains an identifier to allow corresponding packets from different processing sets to be determined.

36. The method of claim 24, wherein a packet contains a sequence number to allow lost packets to be detected.

37. The method of claim 24, further comprising providing a flow control mechanism to prevent overflow of said buffer.

38. The method of claim 24, wherein said fault tolerant system further comprises a bus, whereby matched data transmissions are passed out onto the bus.

39. The method of claim 24, further comprising:
transmitting data from the bridge to each processing set, wherein the data transmissions are initiated from the bridge to the processing sets in synchronism with one another, wherein the data transmissions are subject to variable delays between different ones of said communication links;
buffering the data transmissions received at the processing sets from the bridge for specific time periods to compensate for said variable delays; and
applying the data transmissions received at the processing sets to the respective processing set at a predetermined time.

40. The method of claim 39, wherein each data transmission includes a specified time value, and said predetermined time occurs a set time period after said specified time value.

41. A method for operating a bridge for use in a fault tolerant computing system comprising two or more processing sets configured to operate in synchronism with one another, a bridge and a plurality of communication links connecting each processing set to the bridge, said method comprising:
receiving data transmissions at the bridge from the processing sets, wherein the data transmissions are initiated in synchronism with one another, wherein the data transmissions are subject to variable delays between different ones of said communication links;
buffering the received data transmissions for specific time periods to compensate for said variable delays; and
determining whether the received data transmissions match each other;
wherein the received data transmissions are structured into packets, wherein at least one of the packets includes a sending time;
wherein said buffering the received data transmissions includes transferring the packet for verification within a set time period after the sending time.

42. A method for operating a fault tolerant computing system comprising two or more processing sets configured to operate in synchronism with one another, a bridge and a plurality of communication links connecting each processing set to the bridge, said method comprising:
transmitting data between the processing sets and the bridge over the communication links, wherein the data transmissions over the respective communication links are initiated in synchronism with one another, wherein the data transmissions are subject to variable delays between different ones of said communication links;
buffering the data transmissions received at the bridge from the processing sets for specific time periods to compensate for said variable delays;
determining whether the data transmissions received from the two or more processing sets match one another;
buffering the data transmissions received at the processing sets from the bridge for specific time periods to compensate for said variable delays; and
applying the data transmissions received at the processing sets to the respective processing set at a predetermined time.

* * * * *